(12) United States Patent
Keuchel

(10) Patent No.: US 12,076,940 B2
(45) Date of Patent: Sep. 3, 2024

(54) STABILIZING A DEFORMABLE FABRIC USING AN ELASTIC NONWOVEN WEB

(71) Applicant: Kenneth Keuchel, Cuyahoga Falls, OH (US)

(72) Inventor: Kenneth Keuchel, Cuyahoga Falls, OH (US)

( * ) Notice: Subject to any disclaimer, the term of this patent is extended or adjusted under 35 U.S.C. 154(b) by 0 days.

(21) Appl. No.: 17/300,372

(22) Filed: Jun. 1, 2021

(65) Prior Publication Data

US 2021/0362440 A1 Nov. 25, 2021

Related U.S. Application Data

(63) Continuation-in-part of application No. 15/932,631, filed on Mar. 28, 2018, now abandoned.

(60) Provisional application No. 62/601,680, filed on Mar. 28, 2017.

(51) Int. Cl.
| | | |
|---|---|---|
| *B29C 65/00* | (2006.01) | |
| *B29C 65/70* | (2006.01) | |
| *B29K 623/00* | (2006.01) | |
| *B29K 701/12* | (2006.01) | |
| *B29K 707/04* | (2006.01) | |
| *F41H 1/02* | (2006.01) | |

(52) U.S. Cl.
CPC .......... *B29C 66/7294* (2013.01); *B29C 65/70* (2013.01); *B29C 66/712* (2013.01); *F41H 1/02* (2013.01); *B29K 2623/00* (2013.01); *B29K 2677/10* (2013.01); *B29K 2701/12* (2013.01); *B29K 2707/04* (2013.01); *B29K 2713/00* (2013.01)

(58) Field of Classification Search
None
See application file for complete search history.

(56) References Cited

U.S. PATENT DOCUMENTS

| | | | | |
|---|---|---|---|---|
| 8,443,706 | B2* | 5/2013 | Egres, Jr. | F41H 5/0485 87/8 |
| 2016/0176174 | A1* | 6/2016 | Strauss | B32B 37/1018 156/286 |
| 2016/0200882 | A1* | 7/2016 | Bhat | B32B 5/26 442/327 |

OTHER PUBLICATIONS https://www.procurematerials.co.uk/composite-fabrics-and-sleevings/tx45 (Year: 2023).*

* cited by examiner

*Primary Examiner* — Barbara J Musser
(74) *Attorney, Agent, or Firm* — Andrew F. Sayko, Jr.

(57) ABSTRACT

A process for producing a stable fabric comprising: 1) providing a first fabric formed from reinforcing fibers, 2) providing an elastic nonwoven web produced from elastic fibers, having softening temperature lower than said reinforcing fibers, on at least 1 one side of said first fabric to form a structure, 3) heating said structure to a temperature between the softening temperature and melting temperature of said nonwoven web, and 4) cooling said structure to thereby provide a stable two-dimensional fabric. In the preferred embodiment, the structure of step 2) is put into a mold prior to heating step 3), heating said structure in the mold according to step 3), cooling said structure in the mold according to step 4) and thereby providing a three-dimensional shaped article. A product is also provided produced by these processes.

5 Claims, 4 Drawing Sheets

STABILIZING A DEFORMABLE FABRIC USING AN ELASTIC NONWOVEN WEB

CROSS-REFERENCE TO RELATED APPLICATIONS

This application is a continuation-in-part of United States Application 2015/0225518 filed on 28 Mar. 2018, which is based on a Provisional Application entitled STABILIZING AN ELASTIC OR DEFORMABLE FABRIC filed on 28 Mar. 2017, Ser. No. 62/601,680.

BACKGROUND OF THE INVENTION

Field of the Invention

This invention relates to stabilized textile fabrics commonly used in industrial applications, such as ballistic vests. The invention also relates to their method of manufacture.

Description of the Related Art

The stabilization of textile fabrics has been a problem for many years. In United Kingdom Patent Specification 545,770 accepted 11 Jun. 1942, a process for stabilizing the dimensions of a textile fabric is disclosed. The process comprises providing a textile fabric containing potentially adhesive fibers which are produced by mixing together, prior to spinning, at least one type of thermoplastic fibers having an inherent tackiness upon heating and textile fibers. Upon heating, the thermoplastic fibers are substantially permanently adhered to the textile fibers in the fabric thereby providing dimensional stability.

In United Kingdom Patent Specification 1,420,517 accepted 7 Jan. 1976, a process for stabilizing woven textile structures is disclosed. The process comprises providing tapes formed from multicomponent films having a component with a relatively low softening temperature. Such tapes are woven into a textile structure prior to stabilizing such textile structure. The stabilization of the textile structure is accomplished by heating the textile structure to a temperature between the softening and melting temperatures of the low softening temperature component so that this component bonds to the textile structure thereby providing dimensional stability.

In U.S. Pat. No. 5,691,030 issued 25 Nov. 1997, a process is disclosed for producing stabilized fabrics and reinforced products containing such fabrics. A bonded fabric is provided that comprises a mesh of filaments of the core-sheath type bonded together at the crossing points of the filaments. One method by which reinforcement may be provided is to spin, core-texture, envelope or twist around a yarn such as glass, aramid or carbon, another yarn with a lower melting point than the main reinforcement yarn and to make a composite by applying heat and pressure to bond the lower melting yarn to the reinforcement yarn.

BRIEF SUMMARY OF THE INVENTION

A process is provided for producing a stable fabric designed for the production of shaped articles comprising: 1) providing a first fabric formed from reinforcing fibers, 2) providing an elastic nonwoven web produced from elastic fibers, having a softening temperature lower than the reinforcing fibers, on at least one side of the first fabric from step 1 to form a structure, 3) heating the structure from step 2 to a temperature between the softening temperature and melting temperature of the elastic nonwoven web, and 4) cooling the structure from step 3, to thereby provide a stable two-dimensional fabric. In the preferred embodiment, the structure of step 2) is put into a mold prior to heating step 3), heating the structure from step 2 in the mold according to step 3), cooling the structure from step 3 in the the composite structure mold according to step 4) and thereby providing a three-dimensional shaped article. A product is provided produced by these processes. Alternatively, the elastic nonwoven web may be formed directly on the surface of the reinforcing fibrous fabric. This structure can be further enhanced with resin infusion in its stabilized 30shape.

The claimed process thermally tacks the elastic nonwoven web onto the surface of the fabric formed from braided fibers, which stabilizes the composite structure. The structure consisting essentially of the fabric formed from braided fibers and an elastic nonwoven web is heated to tack the elasric nonwoven web to fabric formed from reinforcing fibers. If the nonwoven web is melted too much, the fibers of the nonwoven web sever at room temperature allowing gaps in the final composite structure. The claimed process provides a precise alignment of reinforcing fibers, which is very important for ballistic performance.

DETAILED DESCRIPTION OF THE INVENTION

Figure 1:
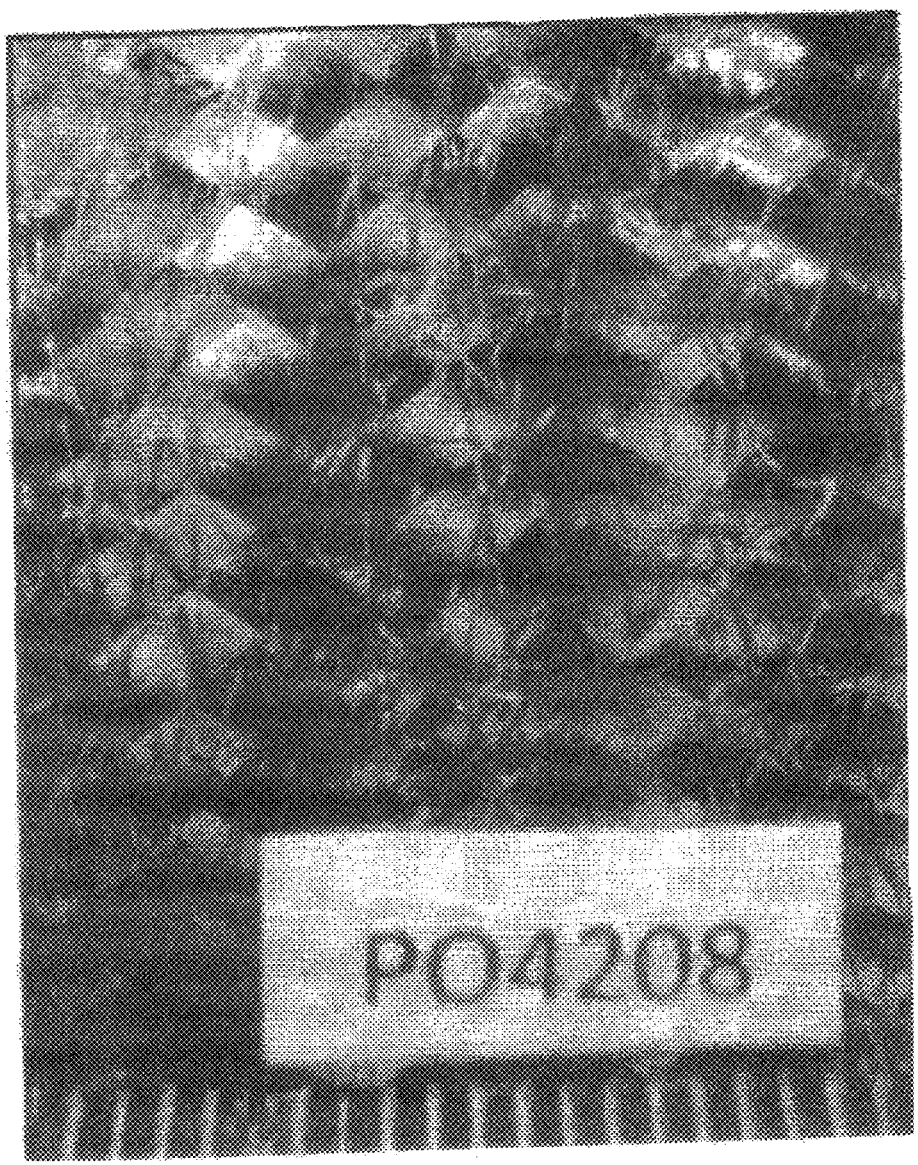
FIG. 1 is a photograph of an. A&P® TX carbon. braid. fiber flat fibrous substrate coated on one side with a SPUNFAB® Polyolefin P04208 nonwoven web.
Figure 2:
FIG. 2 is a photograph of an A&P TX carbon fiber flat fibrous substrate formed from braided fibers, which is then coated on one side with a SPUNFAB® Polyamide PA1203 nonwoven web.
Figure 3:
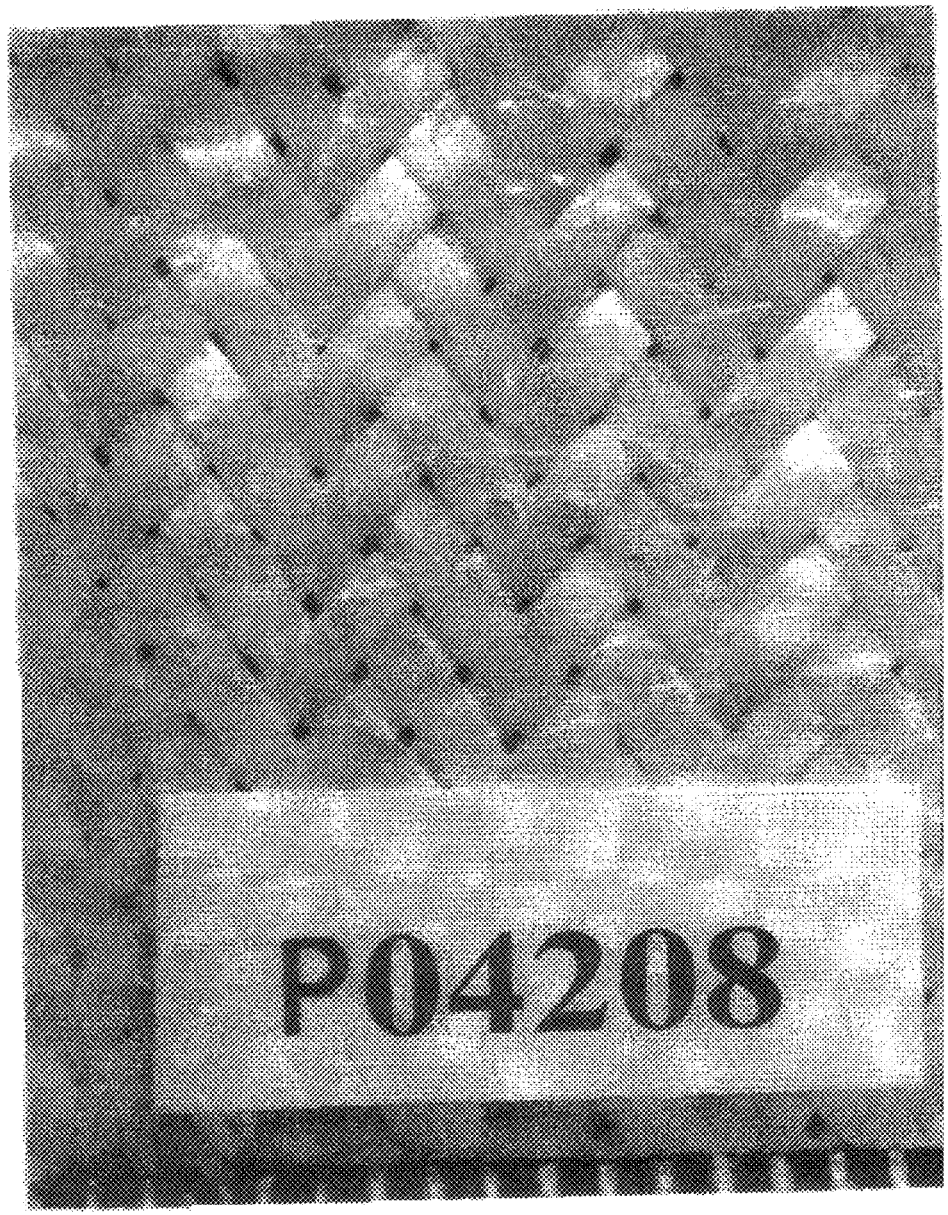
FIG. 3 is a photograph of an A&P aramid braid flat fibrous substrate coated on one side with aa SPUNFAB® Polyolefin P04208 elastic nonwoven web.
Figure 4:
FIG. 4 is a photograph of an A&P aramid flat fibrous substrate coated on one side with a SPUNFAB® Polyamide PA203 elastic nonwoven web. The production of the substrates depicted in FIG. 1. to 4 are described in EXAMPLE 1 below.

Molding a three-dimensional shape from a high modulus fabric formed from fibers, such as ceramic, poly-alpha aramid or carbon fibers, is especially difficult.[3] The usual result is a distorted material with large gaps in the fabric, especially if the fabric is made from a twill or braided fibrous material. Stabilizing the high modulus fabric with an elastic nonwoven web helps to significantly stabilize the high modulus reinforcing fibrous fabric for better handling, by enabling the fabric to be deformed without losing its integrity. This provides the ability to form three-dimensional shapes or to maintain a stable fabric alignment for non-three-dimensional shapes. This also enables the production of a stable +/−forty five degree fabric utilizing an elastic nonwoven web. Without the stabilizing elastic nonwoven web, when the three-dimensional shaped material is stressed or pulled in the machine direction or the transverse direction the material is frequently distorted in that direction while remaining substantially intact. Current production of +/−45° un-stabilized braid is typically shipped with a carrier to maintain width and stability.

The elastic nonwoven web is formed from elastic thermoplastic fibers having a lower softening temperature lower than the softening temperature of the reinforcing fibers. The thermoplastic fiber is preferably a polyamide or a polyolefin, such as polyethylene or polypropylene, and must be an elastic fiber, which facilitates the molding process. Other preferred elastic thermoplastic fibers are: co-polyolefins, polyurethanes, co-polyesters, polyether block amides such as Pebax®, polyester elastomers such as Hytrel®, styrene-ethylene-butylene-styrene polymers, styrene-butadiene-styrene polymers, polyetherketoneketone polymers, polyphenylene sulfide polymers and polyether ether ketone polymers.

The reinforcing fibers are preferably selected from the group consisting of carbon fibers, ceramic fibers, poly alpha-aramid fibers, elastic polyurethane fibers such as Lycra®, polyester fibers, polyamide fibers such as nylon, polypropylene, ultra-high molecular weight polyethylene, melt spun liquid crystal polymer fibers such as Vectran®, and polyvinyl alcohol fibers such as Kuralon®. The subject process may also be used to produce sporting goods, if the reinforcing fibrous fabric were a tubular braided Lycra® fiber with the nonwoven web on one side. This product could be molded to the female form, then used for sportswear or a fashion fabric. The nonwoven web can be formed directly on the surface of the reinforcing fibrous fabric.

EXAMPLE I

About 3 square yards of a substrate of A&P Aramid braid fibers and of A&P TX-45 braided carbon fibers were coated on one side with nonwoven webs of either SPUNFAB® elastic co-Polyamide PA1203 (6 grams per square meter) or SPUNFAB® elastic Polyolefin PO4208 (6 grams per square meter). The coated Aramid substrates were cut into 4 inch by 4 inch squares. The coated carbon fiber substrates were cut into 4.5 inch circles. Each of these substrates were placed on a rectangular tray and placed, for 30-40 seconds, in an oven pre-heated to about 280 Degrees F.

EXAMPLE II

Each of the substrates of EXAMPLE I, prior to the heating step, were put into a stainless steel one half sphere aluminum mold having a radius of about 1.5 inch and then placed in an oven heated to 300 degrees F., for 30-40 seconds. The mold containing the heated fabric and allowed to cool under 4 oz of pressure, to about 160 degrees F. and the mold was opened and the stabilized fabric was removed. The three-dimensional shape of the stabilized fabric was retained and the dimensions of the fabric were substantially retained.

EXAMPLE III

Each of the substrates of EXAMPLE I, after the heating step, were placed in a one half sphere stainless steel mold having a radius of about 1.5 inch. The mold containing the previously heated substrates were placed on a metal tray in the oven maintained at 300 degrees F., for an additional 10 seconds. The molds were removed from the oven and allowed to cool at atmospheric pressure. The shaped structures were removed from the molds and retained the shape of the molds.

This process is particularly applicable to shaped articles formed from braided high modules yarns such as a ceramic, carbon or KEVLAR® poly alpha-aramid fibers, available from Dupont. Such stabilized fabrics can be used for ballistic vests, in three-dimensional form or in two-dimensional form. When carbon fibers are utilized the three-dimensional shaped articles find uses as automotive transmission housings, automotive seat back panels and other shaped articles, such as female breast support and sportswear.

When applying or initially forming an elastic nonwoven web on the surface of the fabric to be stabilized, an elastic nonwoven web is used to produce substantially flat stabilized materials. The flat material can then be heated to a temperature between the softening temperature and the melting temperature of the elastic nonwoven web and then placed in a mold to form a shaped article. The elastic nonwoven web positioned on the surface of the fabric to be stabilized can be: continuous or discontinuous, a single or multi-layered fabric.

Having described my invention, what I desire to claim is:

1. A process for producing a stable three-dimensional fabric consisting of : 1) providing a first fabric formed from braided reinforcing fibers, 2) providing at least one elastic nonwoven web formed from elastic fibers, having a softening point lower than said reinforcing fibers, on at least one side of said first fabric to form a structure, 3) placing said structure of step 2 in a mold, 4) heating said structure in said mold to a temperature between the softening temperature and melting temperature of said elastic nonwoven web, and 5) cooling said structure in said mold, 6) removing said structure from said mold to thereby provide a stable three-dimensional fabric.

2. The process of claim 1 wherein the elastic nonwoven web is formed from elastic thermoplastic fibers.

3. The process of claim 2 wherein the elastic thermoplastic fiber is a polyamide or co-polyamide.

4. The process of claim 1 wherein the reinforcing fibers are selected from the group consisting of carbon fibers, ceramic fibers and poly alpha-aramid fibers.

5. The process of claim 2 wherein the elastic thermoplastic fiber is a polyolefin or co-polyolefin, polyurethane, polyester, or co-polyester.

* * * * *